(12) United States Patent
Sels et al.

(10) Patent No.: US 12,503,410 B2
(45) Date of Patent: Dec. 23, 2025

(54) LIGNOCELLULOSE REFINERY

(71) Applicant: KATHOLIEKE UNIVERSITEIT LEUVEN, Leuven (BE)

(72) Inventors: Bert Sels, Westerlo (BE); Yuhe Liao, Guangzhou (CN)

(73) Assignee: KATHOLIEKE UNIVERSITEIT LEUVEN, Leuven (BE)

( * ) Notice: Subject to any disclaimer, the term of this patent is extended or adjusted under 35 U.S.C. 154(b) by 417 days.

(21) Appl. No.: 18/039,106

(22) PCT Filed: Oct. 28, 2021

(86) PCT No.: PCT/EP2021/079928
§ 371 (c)(1),
(2) Date: May 26, 2023

(87) PCT Pub. No.: WO2022/090364
PCT Pub. Date: May 5, 2022

(65) Prior Publication Data
US 2024/0116835 A1 Apr. 11, 2024

(30) Foreign Application Priority Data

Oct. 28, 2020 (GB) .................... 2017122

(51) Int. Cl.
*C07C 1/22* (2006.01)
*B01J 21/06* (2006.01)
(Continued)

(52) U.S. Cl.
CPC ............... *C07C 1/22* (2013.01); *B01J 21/063* (2013.01); *B01J 23/42* (2013.01); *B01J 23/44* (2013.01); *D21C 3/006* (2013.01); *D21C 3/222* (2013.01); *D21C 11/0007* (2013.01); *C07C 2521/04* (2013.01); *C07C 2521/06* (2013.01); *C07C 2521/08* (2013.01); *C07C 2523/42* (2013.01); *C07C 2523/44* (2013.01); *C07C 2523/46* (2013.01); *C07C 2523/755* (2013.01)

(58) Field of Classification Search
None
See application file for complete search history.

(56) References Cited

U.S. PATENT DOCUMENTS

2010/0137663 A1* 6/2010 Chen ................ C10G 1/083
585/252
2014/0135470 A1* 5/2014 Murray ............. C07C 29/156
568/822

FOREIGN PATENT DOCUMENTS

WO 2015061802 A1 4/2015

OTHER PUBLICATIONS

Xu et al. ("Reductive cleavage of inert aryl C—O bonds to produce arenes", Chem. Commun., 2015, 51, 12212-12215) (Year: 2015).*
(Continued)

*Primary Examiner* — Ali Z Fadhel
(74) *Attorney, Agent, or Firm* — Workman Nydegger

(57) ABSTRACT

In general, present invention concerns an integrated lignocellulose-to-chemicals biorefinery, enabling production of renewable n-propylbenzene, phenolic oligomers, and carbohydrate pulp from lignocellulosic biomass. And it concerns an integrated biorefinery, enabling production of renewable n-propylbenzene, phenolic oligomers, and carbohydrate pulp from lignocellulosic biomass.

24 Claims, 4 Drawing Sheets

(51) Int. Cl.
  *B01J 23/42* (2006.01)
  *B01J 23/44* (2006.01)
  *D21C 3/00* (2006.01)
  *D21C 3/22* (2006.01)
  *D21C 11/00* (2006.01)

(56) References Cited

OTHER PUBLICATIONS

Liu et al., "Gas-phase hydrodeoxygenation of bio-oil model compound over nitrogen-doped carbon-supported palladium catalyst", Proceedings of the Combustion Institute, vol. 38, No. 3, Aug. 21, 2020, pp. 4345-4353.
Sharma et al., "Carbon based catalysts for the hydrodeoxygenation of lignin and related molecules: A powerful tool for the generation of non-petroleum chemical products including hydrocarbons", Renewable and Sustainable Energy Reviews, vol. 133, Aug. 28, 2020, 18 pages.
Verma et al., "Molecular modeling approach to elucidate gas phase hydrodeoxygenation of guaiacol over a Pd(111) catalyst within DFT framework", Journal of Molecular Modeling, vol. 24, No. 9, Aug. 27, 2018, pp. 1-16.
Zhu et al., "Bifunctional transalkylation and hydrodeoxygenation of anisole over a Pt/HBeta catalyst", Journal of Catalysis, vol. 281, No. 1, Mar. 30, 2011, pp. 21-29.
Yohe et al., "High-pressure vapor-phase catalytic hydrodeoxygenation of lignin-derived compounds to hydrocarbons on bimetallic catalysts in the range of 0.2-2.4 mpa", Thesis/Dissertation Acceptance, Purdue University, Dec. 1, 2013, 194 pages.
International Search Report from corresponding PCT Application No. PCT/EP2021/079928, Feb. 4, 2022.
International Preliminary Report on Patentability from corresponding PCT Application No. PCT/EP2021/079928, May 2, 2023.

* cited by examiner

LIGNOCELLULOSE REFINERY

TECHNICAL FIELD

In general, present invention concerns an integrated biorefinery, enabling production of renewable n-propylbenzene, phenolic oligomers, and carbohydrate pulp from lignocellulosic biomass.

BACKGROUND

Production of chemicals is rapidly becoming the single largest driver of global oil consumption in the future To reduce the oil consumption and the resulting greenhouse gas emission, a shift from non-renewable fossil to renewable carbon resources is required. Lignocellulose, as an abundant feedstock of renewable carbon, can be used for production of bio-fuels, bio-chemicals and bio-materials.

However, most of the proposed lignocellulose biorefineries cannot economically compete with oil refineries due, in part, to incomplete utilization of feedstock. Therefore, it is imperative to maximize feedstock utilization to be not only cost but also environmentally competitive with fossil oil-based processes There is thus a need for new integrated biorefinery concepts that offer biomass refining with low energy requirements and high feedstock utilization (both carbon and mass) efficiency, providing multiple products stream into markets. The inherent heterogeneity of lignocellulose, comprising entangled sugar-based (i.e. (hemi-)cellulose) and aromatic (i.e. lignin) biopolymers, complicates its valorization into high value products. In particular, production of high value chemicals from lignin—a methoxylated phenylpropanoid biopolymer—is challenging due to its inherent recalcitrance and heterogeneity.

In contrast to relatively low functionality fossil oil, functional groups are plentiful in lignocellulose. Therefore, functionalized aromatics, such as alkylated aromatics are among the most suggested chemicals from lignin, but product yields on lignin weight basis are currently low. Hence, we invented an integrated lignocellulose biorefinery that simultaneously produces n-propylbenzene, and phenolic oligomers from in planta lignin, and a carbohydrate pulp.

n-Propylbenzene is utilized as an organic solvent in industries such as printing and the dyeing of textiles and in the manufacture of methylstyrene. Alkylaromatics are usually produced by Friedel—Crafts alkylation of benzene over acid catalysts such as zeolites. However, Friedel—Crafts alkylation benzene usually gives isopropylbenzene as the product due to higher thermodynamic stability of the secondary propyl carbocation as compared to the primary one.

Therefore, its selective production in a traditional petrorefinery via alkylation of benzene is challenging. Besides, the traditional process uses non-renewable fossil carbon. It is imperative to produce n-propylbenzene from green carbon source.

Lignin, a natural alkyl-phenolic bio-polymer and second largest constituent in lignocellulose, could produce vast amounts of renewable aromatics, providing selective and industrially feasible lignin conversion strategies are available. Literature reports many (catalytic) routes to convert lignin into chemicals and fuels, but the on-purpose lignin-to-n-propylbenzene route is studied less intensively. The main challenge lies in finding a strategy that combines (i) a high degree of lignocellulose delignification, with (ii) selective cleavage of CAr—O bonds (iii) without destructing the n-propyl chain, while iv) keeping the carbohydrates unchanged.

Recently, more practical lignin first lignocellulosic biorefinery concepts were elaborated, based on the active stabilization of in planta lignin (intermediates) to avoid irreversible condensation of reactive intermediates.

Unlike previous attempts, which used recalcitrant technical lignin, this in planta lignin depolymerization strategy produces a select number of methoxylated and alkylated (rich in C3 chain) phenolic monomers in close-to-theoretical yields, viz. 20 and 50 wt. % for soft- and hardwoods, respectively.

Since the monomeric fraction only contains few and structural alike methoxy(alkyl)phenols, their isolation and conversion into n-propylbenzene are practical to handle. Therefore, a distinct catalytic strategy is herein invented that converts the crude mixture of methoxylated and alkylated phenolic monomers, obtained from RCF of wood, into n-propylbenzene.

The instability of catalysts may reduce the profitability of the biorefinery. Thus, it is essential to develop both selective and stable heterogeneous catalysts for conversion of RCF lignin monomers into n-propylbenzene.

In this patent, the in planta lignin was first converted into monomers (rich in guaiacols and syringols, about 50 wt. % for birch wood lignin), followed by hydrodeoxygenation of these monomers into n-propylbenzene (6-30 wt % on the basis of lignin intake). This work produces not only n-propylbenzene in high yield, but also with stable catalysis. Besides, the more recalcitrant alkylated syringol can be converted into n-propylbenzene, which has never been reported in the literature.

Further, hydrodeoxygenation of RCF lignin derived monomers into n-propylbenzene is not yet reported with both selective and stable catalysis. Considering the thermodynamic equilibrium between n-propylbenzene and n-propylcyclohexane, it is favored to conduct it at low pressure and high temperature. In order to avoid the energy and solvent cost in the liquid phase reaction, we pursued a solvent-free continuous catalytic gas-phase hydroprocessing step, which is able to selectively funnel real lignocellulose-derived methoxyalkylphenols into n-propylbenzene in a scalable fixed-bed setup.

BRIEF SUMMARY

The present invention solves the problems of the related art that the practical benefits of yielding high-value chemicals from lignin (an alkylphenolic biopolymer) are challenging due to its inherent recalcitrance and heterogeneity and that production of n-alkyl chain substituted aromatic hydrocarbon is a challenge for traditional oil refinery. High value aromatics are among the most-suggested chemicals from lignin, but that product yields (such as n-propylbenzene) on lignin weight basis are low. In addition, next to n-propylbenzene, also low MW highly functionalised phenolic oligomers, and a processable carbohydrate pulp are produced by this process. Moreover, conversion of lignin to n-propylbenzene with selective and especially stable catalysis is a challenge due to the recalcitrant properties of lignin (monomers).

In accordance with the purpose of the invention, as embodied and broadly described herein, the invention is broadly drawn to a lignocellulose biorefinery process that produces a carbohydrate pulp and convert lignin into small molecules and oligomers, whereby the process involves 1) reductive catalytic fractionation (biomass fractionation with lignin depolymerisation) of lignocellulose, 2) forming a lignin oil comprising a monomer and oligomer fraction, 3)

separating the monomer and oligomer fraction through liquid-extraction, 4) further converting of said monomer fraction by gas-phase hydrodeoxygenation over metal catalysts such as platinum on $TiO_2$.

In one aspect of the invention, is a lignocellulose biorefinery process that produces a carbohydrate pulp and converts lignin into small molecules and oligomers, whereby the process comprising the following steps: a) subjecting a lignocellulose mass in contact with a metal catalyst, $H_2$ and an organic solvent to reductive catalytic fractionation to produce a carbohydrate pulp and a liquid, b) solvent evaporation from the liquid to obtain lignin oil, hereby recycling the solvent for reuse in step a, and recycling $H_2$ and formed methane for reuse in step d. c) contacting the lignin oil to a two-step liquid extraction with first $H_2O$ and $CH_2Cl_2$ or ethylacetate to isolated 1) a sugar water stream, and subsequently an extraction of the sugar-free lignin oil with an alkane solvent, such as hexane, heptane or octane, whereby are separated 2) lignin oligomers and 3) lignin monomers, d) hydrodeoxygenation of lignin monomers by bringing said lignin monomers in contact with the gas stream from step b, comprising $H_2$ and methane, in a process to generate a stream comprising n-propylbenzene, methane, methanol $H_2O$, $H_2$, e) separating and purifying said stream from step d to obtain a n-propylbenzene fraction and an organics water fraction.

Another aspect of the invention is a lignocellulose biorefinery process that produces a carbohydrate pulp and converts lignin into small molecules, whereby the process involves the following steps 1) first, crude lignin-oil and pulp are produced by reductive catalytic fractionation (RCF) in either batch or (semi-)continuous modus, followed by liquid/solid separation and solvent evaporation, 2) solubilised sugars in the lignin oil are isolated in a liquid-liquid extraction unit 3) lignin monomers are isolated from the refined lignin oil (step 2) through extraction with an alkane solvent, 4) said extract is subjected to flash distillation to remove the extraction solvent from the lignin monomers, 5) the crude monomer extract (monomers fraction), together with a $H_2$-gas stream, such as the gas stream from reductive catalytic fractionation, containing amongst others methane impurities (from methane formation during RCF) are fed into the gas-phase fixed-bed setup, containing metal catalyst such as Pt to form n-propylbenzene 6) product separation is carried out in a separator, producing a liquor of n-propylbenzene, and a gaseous mixture of water, $H_2$, $CH_3OH$ and $CH_4$.

Some embodiments of the invention are set forth in claim format directly below:

1. A method comprising the steps of:
a) providing a mixture of compounds of formula (I):

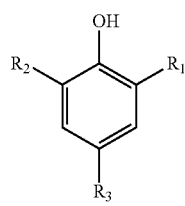

(I)

wherein:
each occurrence of R1 and R2 is independently selected to be —O—CH3 or —H;

each occurrence of R3 is independently selected to be —H, or -methyl, or -ethyl, or -propyl, or -propylene, or -1-alkoxypropyl, or -3-hydroxypropyl;

b) preparing a reaction mixture by contacting said mixture of compounds of step a) in gas phase, with a reaction mixture containing a metal-based catalyst, under a hydrogen containing gas atmosphere;

wherein step b) is carried out at a temperature of at least 265° C. and a partial hydrogen pressure of at least 0.2 bar;

c) obtaining from step b) products comprising a mixture of compounds of formula (Ia), as well as methane or methanol or both.

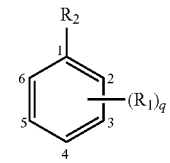

(Ia)

wherein:

R1 is independently selected to be —CH3 or —H;

R2 is independently selected to be -propyl or -ethyl;

q represents the position on the aromatic ring, with q being any one of the numbers 2-6

2. The method as in embodiment 1, comprising the steps of:

a) providing a mixture of compounds of formula (I):

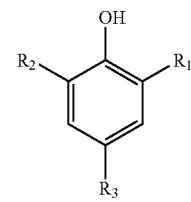

(I)

wherein:

each occurrence of R1 and R2 is independently selected to be —O—CH3 or —H;

each occurrence of R3 is independently selected to be —H, or -methyl, or -ethyl, or -propyl, or -propylene, or -1-alkoxypropyl, or -3-hydroxypropyl;

b) preparing a reaction mixture by contacting said mixture of compounds of step a) in gas phase, with a reaction mixture containing a metal-based catalyst, under a hydrogen containing gas atmosphere;

wherein step b) is carried out at a temperature of at least 265° C. and a partial hydrogen pressure of at least 0.2 bar;

c) obtaining from step b) products comprising a mixture of compounds of formula (Ia), as well as methane or methanol or both.

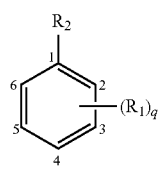

(Ia)

wherein:
R1 is independently selected to be —CH3 or —H;
R2 is independently selected to be -propyl or -ethyl;
q represents the position on the aromatic ring, with q being any one of the numbers 2-6
wherein the transformation of (I) to (Ia) occurs via the intermediate (Ib)

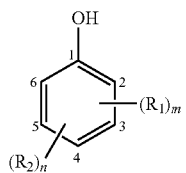

(Ib)

wherein:
R1 is independently selected to be —CH3 or —H;
R2 is independently selected to be —H, or -methyl, or -ethyl, or -propyl;
m and n represent the position on the aromatic ring, with m being any one of the numbers 2-6 and with n being any one of the numbers 3-5, with m not being equal to n.

3. The method as in embodiments 1-2, wherein the mixture of compounds of formula (I) is subjected to hydrodeoxygenation.

4. The method as in embodiment 1-3, wherein said metal-based catalyst comprises metal attached on a support material.

5. The method as in embodiments 1-4, wherein said metal-based catalyst comprises metal attached on a oxide support material.

6. The method as in embodiments 1-5, wherein said catalyst comprises a platinum group metal (PGM) selected of platinum or palladium, and whereby this metal is on a titanium oxide support.

7. The method as in embodiments 1-6, wherein said catalyst is selected of a promoter-modified platinum catalyst or a promoter-modified palladium catalyst.

8. The method as in embodiments 1-7, wherein said catalyst achieves a constant conversion of the mixture of compounds with formula (I) for a time on stream of at least 5 hours, measured at a conversion level below full conversion.

9. The method as in embodiments 1-8, wherein in step b) a partial pressure of 0.2-10 bar $H_2$ is used.

10. The method as in embodiments 1-9, wherein in step b) a partial pressure of 0.2-1 bar $H_2$ is used.

11. The method as in embodiments 1-10, wherein a mixture of compounds with formula (Ia) is obtained in >60% molar yield based on a mixture of compounds with formula (I).

12. The method as in embodiments 1-11, wherein n-propylbenzene is obtained in >40% molar yield based on a mixture of compounds with formula (I).

13. The method according to anyone of embodiments 1-12; wherein said mixture of compounds of formula (I) are derived from lignocellulose.

14. The method according to anyone of embodiments 1-13; wherein said mixture of compounds of formula (I) are derived from lignocellulose feedstock and are present in the lignin monomers enrich fraction obtained via a lignocellulose biorefinery process comprising the following steps: 1) reductive catalytic fractionation (biomass fractionation with lignin depolymerisation) of lignocellulose, forming two fractions, a carbohydrate pulp and lignin oil, 2) separating the carbohydrate pulp and lignin oil fractions, 3) separating the monomer and oligomer fractions present in the lignin oil.

15. The method according to anyone of embodiments 1-14; wherein said mixture of compounds of formula (I) are derived from lignocellulose feedstock, being present in the lignin monomers fraction obtained via a lignocellulose biorefinery process comprising the following steps: 1.a) subjecting a lignocellulose mass in contact with a metal catalyst, $H_2$ and solvent to reductive catalytic fractionation to produce a carbohydrate pulp and a liquid, b) solvent evaporation from the liquid to obtain lignin oil, hereby recycling the solvent for reuse in step a, and recycling $H_2$ and formed methane for reuse in step d. c) contacting the lignin oil to a two-step liquid extraction with first $H_2O$ and $CH_2Cl_2$ or ethylacetate to isolate 1) a sugar water stream, and subsequently an extraction of the sugar-free lignin oil with an alkane solvent, such as hexane, heptane or octane, whereby are separated 2) lignin oligomers and 3) lignin monomers.

16. The method according to anyone of the embodiments 1-15; whereby the lignocellulose biorefinery process comprises lignocellulose fractionation with lignin depolymerisation.

17. The method according to anyone of the embodiments 1-16; whereby the lignin oil formed is rich in extractable phenolic monomers.

18. The method according to anyone of the embodiments 1-17; wherein the lignocellulose mass comprises hardwood, softwood, herbaceous biomass, straw, bark, waste wood, flax shives, sugar cane bagasse, corn stover or crop residues.

19. The method according to anyone of the embodiments 1-18; whereby methyl acetate from the acetyl group of lignocellulose, separated in the solvent recovery distillation, together with excess $H_2$, $CH_4$, $CH_3OH$, and small amounts of solvent, are sent to the incineration/trigeneration to foresee heating, cooling and electricity.

20. The method according to anyone of the embodiments 1-19; whereby more than 1-fold mass of n-hexane to lignin-oil extracts more than 70 wt. % of the phenolic monomers.

21. The method according to anyone of embodiments 1-20; wherein said lignin monomers fraction, together with a $H_2$-gas stream, such as the gas stream from reductive catalytic fractionation, containing amongst others methane impurities (from methane formation during RCF) are fed into the gas-phase fixed-bed setup, containing Pt or Pd catalyst to n-propylbenzene, 2) product separation is carried out in a gas-liquid separator, producing a liquor of n-propylbenzene, and a gaseous mixture of water, $CH_3OH$, $H_2$ and $CH_4$.

22. The method according to anyone of embodiments 1-21; wherein >35% of the lignin present in the lignocellulose is converted into n-propylbenzene and phenolic oligomers.

23. The method according to anyone of embodiments 1-22; whereby to obtain highly pure n-propylbenzene, impurities like n-propylcyclohexane are removed by distillation.

24. The method according to anyone of the embodiments 1-23; whereby n-propylbenzene, phenolic oligomers and a carbohydrate pulp are produced from in planta lignin with an overall carbon efficiency of >60%;

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION

Figure 1:
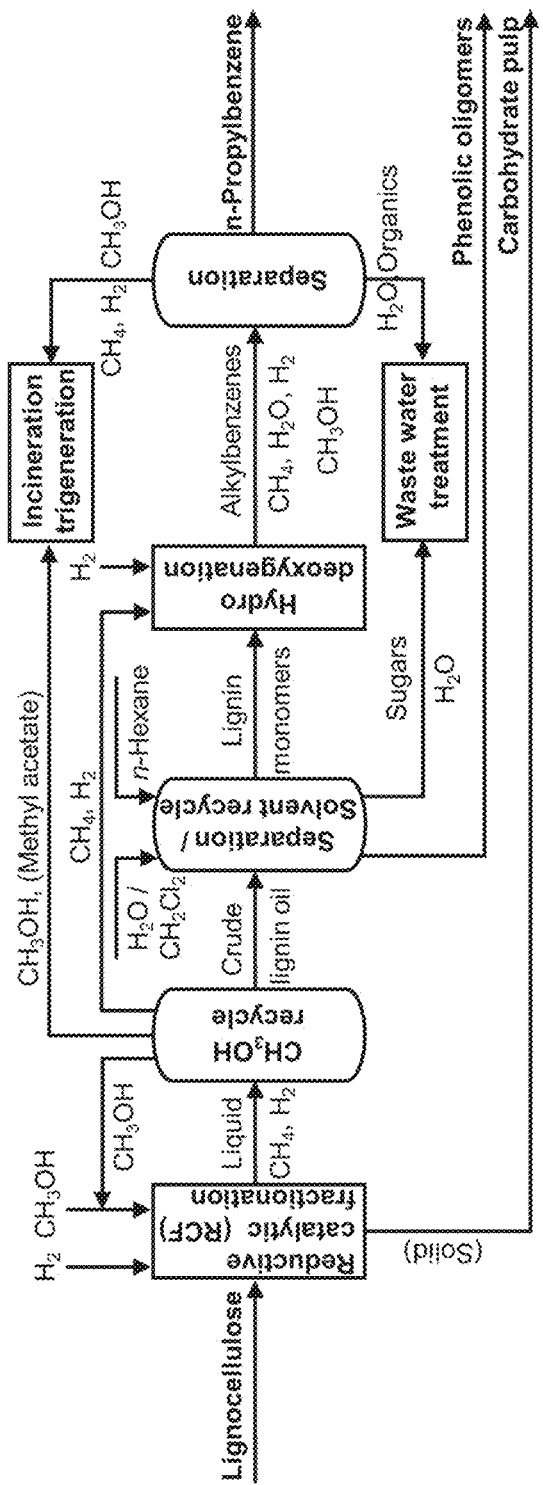
FIG. 1. Integrated biorefinery process for carbohydrate pulp, n-propylbenzene, and phenolic oligomers production from lignocellulose.

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Several documents are cited throughout the text of this specification. Each of the documents herein (including any manufacturer's specifications, instructions etc.) are hereby incorporated by reference; however, there is no admission that any document cited is indeed prior art of the present invention.

The present invention will be described with respect to particular embodiments and with reference to certain drawings but the invention is not limited thereto but only by the claims.

The drawings described are only schematic and are non-limiting. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to the devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Other embodiments of the invention will be apparent to those skilled in the art from consideration of the specification and practice of the invention disclosed herein.

It is intended that the specification and examples be considered as exemplary only.

Each and every claim is incorporated into the specification as an embodiment of the present invention. Thus, the claims are part of the description and are a further description and are in addition to the preferred embodiments of the present invention.

Each of the claims set out a particular embodiment of the invention.

The following terms are provided solely to aid in the understanding of the invention.

Definitions

A "small molecule" is broadly used herein to refer to an organic compound typically having a molecular weight of less than about 250.

"Oligomers" are broadly used herein to refer to organic compounds, obtained after lignin depolymerisation, typically having a molecular weight between 250-5000 g/mol.

Description

Production of chemicals is rapidly becoming the single largest driver of global oil consumption in the future.

To reduce the oil consumption and the resulting greenhouse gas emission, a shift from non-renewable fossil to renewable carbon resources is required. Lignocellulose, as an abundant feedstock of renewable carbon, can be used for production of bio-fuels, bio-chemicals and bio-materials.[3-4] However, most of the proposed lignocellulose biorefineries cannot economically compete with oil refineries due, in part, to incomplete utilization of feedstock. Therefore, it is imperative to maximize feedstock utilization to be not only cost but also environmentally competitive with fossil oil-based processes.

There is thus a need for new integrated biorefinery concepts that offer biomass refining with low energy requirements and high feedstock utilization (both carbon and mass) efficiency, providing multiple products stream into markets. The inherent heterogeneity of lignocellulose, comprising entangled sugar-based (i.e. (hemi-)cellulose) and aromatic (i.e. lignin) biopolymers, complicates its valorization into high value products. In particular, production of high value chemicals from lignin—a methoxylated phenylpropanoid biopolymer—is challenging due to its inherent recalcitrance and heterogeneity.

In contrast to relatively low functionality fossil oil, functional groups are plentiful in lignocellulose. Therefore, functionalized aromatics, such as alkylated aromatics are among the most suggested chemicals from lignin, but product yields on lignin weight basis are currently low. Hence, we invented an integrated lignocellulose biorefinery that simultaneously produces n-propylbenzene, and phenolic oligomers from in planta lignin, and a carbohydrate pulp.

The first step of our approach rests on a specific type of lignin first biorefining, termed reductive catalytic fractionation (RCF).

RCF of lignocellulose yields a solid carbohydrate pulp and a lignin-oil by cleavage of ester and ether bonds as a result of tandem high-temperature solvolysis, hydrogenation and hydrogenolysis either in batch or in (semi-)continuous mode over a metal catalyst in the presence of a reducing agent, such as hydrogen. The general consensus is that stabilization of the reactive intermediates formed by depolymerization of in planta lignin prevents the formation of unreactive condensed lignin derivatives.

Near-complete delignification of hardwoods, such as birch and poplar, can be achieved without significant carbohydrate degradation.

Besides low molecular weight oligomers, the lignin-oil contains few phenolic monomers in close-to-theoretical yields, viz. 50 wt. % for hardwoods.

However, maximal valorization of this lignin-oil into high value products, such as phenol or other aromatics, has not yet been demonstrated, and is key in demonstrating the potential of biorefineries.

The high degree of delignification for hardwoods toward phenolic monomers enables us to propose an integrated process for transformation of wood lignin to n-propylbenzene. Typical phenolic monomers composition (50.5 wt. % on lignin basis, example 1) of RCF, from birch wood in MeOH over commercial Ru/C, shows 4-n-propylguaiacol (PG; 19 wt. %) and—syringol (PS; 67 wt. %), besides few others like 4-ethylguaiacol (EG) and -syringol as major products. While alkyl is the main substituent of the guaiacol/syringol monomers, considerably more polar groups containing primary alcohols remain in the oligomers structure. This polarity difference facilitates their practical separation; a simple extraction in n-hexane under reflux allows the isolation of the phenolic monomers. This work demonstrates that a less than six-fold mass of n-hexane to lignin-oil cost-efficiently extracts more than 90 wt. % of the phenolic monomers (example 3), and is therefore selected as the optimum trade-off between extraction efficiency, solvent usage, and oligomer co-extraction. Further (costly) separation of the individual phenolic monomers is not necessary as the crude will be completely funneled to n-propylbenzene.

The next step in our integrated refinery is hydrodeoxygenation (or hydrotreating, or hydroprocessing) of the monomers stream into to n-propylbenzene. Continuous gas-phase hydrodeoxygenation was conducted without solvent, to avoid additional cost due to solvent loss and recovery from the engineering pointview and from the thermodynamic aspect. Catalysts including supported Pt, Pt, Ru, Ni catalysts were evaluated for n-propylbenzene production from 4-propylguaiacol and 4-propylsyringol under atmospheric pressure with 0.98 bar $H_2$ partial pressure. Pt on $TiO_2$ shows the highest n-propylbenzene yield compared to other catalysts. Besides, Pt/$TiO_2$ has a longer life time (i.e. higher stability) compared to other catalysts.

In an alternative embodiment promoter-modified Pt catalysis or support modification is used to further enhance the catalytic performances such as activity, selectivity, and stability. Promoter species such as V, W, La, and Mo, could have similar roles in the enhancement of catalytic performance for the Pt-based supported with support preferably on $TiO_2$.

Based on the preceding results of hydrodeoxygenation of pure compounds, hydrodeoxygenation of crude monomers stream (obtained from the extraction) was investigated. The yield to n-propylbenzene remains similarly high (ca. 80%) at the same conditions for both softwood and hardwood derived crude monomers stream. This demonstrates robustness of the Pt/$TiO_2$ based catalysts for conversion of real biomass feedstock.

On the basis of the experimental data, we designed an integrated process (FIG. 1). The process integrates the three catalytic steps. First, lignin-oil and pulp are produced by reductive catalytic fraction lignocellulose processing in either batch or (semi-)continuous reactor. After the liquid/solid separation, monomers isolation from lignin-oil is readily achieved in a liquid extraction unit, followed by flash distillation to remove n-hexane. Thereafter, the crude extract (monomers fraction), together with RCF off gas containing $H_2$ and some methane impurities (from MeOH in RCF) are fed into the gas-phase fixed-bed setup, containing catalyst such as Pt based catalyst to form n-propylbenzene (i.e. hydrodeoxygenation). Next, product separation is foreseen in a gas-liquid separator, producing a liquor of n-propylbenzene, and a gaseous mixture of water, $CH_3OH$, $H_2$ and $CH_4$. Finally, to obtain highly pure n-propylbenzene, impurities like n-propylcyclohexane in the n-propylbenzene fraction are removed. The degraded sugars (from RCF) and side products like alkylcyclohexanes are treated in the waste water. Methyl acetate from the acetyl group of lignocellulose, which is largely separated in the methanol recovery distillation, excess $H_2$, $CH_4$, and small amounts of methanol (from distillation and hydrodeoxygenation) are sent to the incineration/trigeneration to foresee heating, cooling and electricity.

Particular and preferred aspects of the invention are set out in the accompanying independent and dependent claims. Features from the dependent claims may be combined with features of the independent claims and with features of other dependent claims as appropriate and not merely as explicitly set out in the claims.

Thus, the claims following the detailed description are hereby expressly incorporated into this detailed description, with each claim standing on its own as a separate embodiment of this invention.

General Experimental Procedure

I. Reductive Catalytic Fractionation of Lignocellulose:

For the production of the lignin-derived phenolic monomers, oligomers, and carbohydrate pulp, a 2 L stirred batch reactor (Parr Instruments Co.) was loaded with 150 g of lignocellulose (particle size: <10 mm), 800 mL of organic solvent and 15 g of catalyst. The reaction vessel was closed and flushed three times with $N_2$ (8 bar) in order to remove the residual oxygen. High pressure $H_2$ was applied on the reaction mixture before heating, and the reactor is stirred at 720 rpm. The reaction was performed at 235° C. After several hours, the reaction was terminated by rapid cooling with compressed air flow and water. The reactor content was filtered in order to separate the solid fraction, containing the carbohydrate pulp and the catalyst, and the liquid fraction, containing the lignin oil and some soluble sugar products. To collect all liquid fraction, the solid residue was washed with ethanol. Afterwards, organic solvent used in the reaction and ethanol were removed from the liquid phase by rotary evaporation to yield a crude brownish colored lignin oil, containing some soluble sugar products next to phenolic monomers and oligomers.

A threefold liquid-liquid extraction with water and ethyl acetate at a mass ratio of 1/3/3 (crude lignin oil/ethyl acetate/water) was performed to separate the soluble sugar products from the lignin-derived products, prior to gas chromatographic analysis and lignin monomers separation (vide infra). Note that >99 wt. % of the lignin derived monomers in the lignin oil is present in the ethyl acetate phase, while >99 wt. % of sugar products are presented in water phase. Evaporation of ethyl acetate yielded the sugar-free lignin oil, consisting of phenolic monomers and oligomers. The weight of the sugar-free lignin oil was used to calculate the degree of delignification (on the basis of the Klason lignin weight) and to quantify the lignin products. The phenolic monomers were quantified using a Gas Chromatograph (GC, Agilent 6890) equipped with a HP5 column and a FID. 2-Isopropylphenol was used as the internal standard. The following parameters were used in the GC analysis: injection and detection temperature of 300° C., column temperature program: 50° C. (2 min), 15° C. min$^{-1}$ to 150° C., 10° C. min$^{-1}$ to 220° C. and 20° C. min$^{-1}$ to 290° C. (12 min).

II Lignin Monomers Extraction

To isolate the lignin-derived phenolic monomers from the sugar-free lignin oil, liquid-liquid extraction was applied. After removal of the soluble sugars (RCF part), the purified lignin oil was subjected to a three or fourfold reflux extraction with alkane (at 80° C. of oil bath for 3 h), and the extract was distilled in vacuo to obtain a transparent yellowish oil. This oil presents the concentrated fraction of the phenolic monomers.

III. Hydrodeoxygenation

In a typical experiment, certain amount of catalyst, pelletized to a 0.125-0.25 mm fraction, was loaded into the four quartz reactor tubes and held by two layers of quartz wool. The catalyst was diluted with quartz powder (0.125-0.25 mm) to reduce the local hot spots and to improve the temperature distribution, yielding a catalyst bed with a height of ca. 15 mm. Reactor temperature in axial direction of the oven at height of the catalyst bed is homogeneous. The gas phase substrate, $H_2$, and $N_2$ were mixed in a mixer before feed into the reactor. Typically, the molar composition of the gas mixture in the reactor before reaction is 0.02/0.4/0.58 (for substrate/$H_2$/$N_2$) or 0.2/0.98 (for substrate/$H_2$). The effluent gases were analyzed using an online GC (HP4890D) equipped with two parallel columns (HP1 column and Porapolt Q column), both connected with a FID. The unit of WHSV is g $g_{catal}^{-1}h^{-1}$·(i.e. $h^{-1}$).

EXAMPLES

Example 1. Reductive Catalytic Fractionation of Birch Wood

This experiment was performed according to experimental procedure I. birch wood (150 g) was used as the feedstock, 5 wt % Ru/C as a catalyst, and methanol as the solvent. The reaction was conducted at 235° C. for 3 h under 30 bar of $H_2$ (room temperature). Conversion of lignin: 80.69%. Monomers yield (on the basis of Klason lignin): 4-propylguaiacol (7.6 wt %), 4-propylsyringol (24.4 wt %), total monomers (42.2 wt %).

Example 2. Monomers Extraction

This experiment was performed according to experimental procedure II. n-Heptane was used as the solvent with a threefold reflux extraction at n-hexane/lignin=3:1 (mass ratio). The extract efficiency for the extractable monomers is higher than 85%, in this particular example 93.9%.

Example 3. Hydrodeoxygenation

This experiment was performed according to experimental procedure III. 4-propylguaiacol was used as feedstock, 5 wt % Rh/$Al_2O_3$ as a catalyst. WHSV=4.5 $h^{-1}$. Reaction temperature: 285° C. 0.4 bar $H_2$ (1 bar of total pressure). Conversion of 4-n-propylguaiacol=50%, yield to n-propylbenzene<2%.

Example 4. Hydrodeoxygenation

This experiment was performed according to experimental procedure III. 4-propylguaiacol was used as feedstock, 5 wt % Pt/$Al_2O_3$ as a catalyst. WHSV=4.5 $h^{-1}$. Reaction temperature: 285° C. 0.4 bar $H_2$ (1 bar of total pressure). Conversion of 4-n-propylguaiacol=76.2%, yield to n-propylbenzene<3%.

Example 5. Hydrodeoxygenation

This experiment was performed according to experimental procedure III. 4-propylguaiacol was used as feedstock, 17 wt % Ni/$Al_2O_3$ as a catalyst. WHSV=4.5 $h^{-1}$. Reaction temperature: 285° C. 0.4 bar $H_2$ (1 bar of total pressure). Conversion of 4-n-propylguaiacol=60%, yield to n-propylbenzene<3%.

Example 6. Hydrodeoxygenation

This experiment was performed according to experimental procedure III. 4-propylguaiacol was used as feedstock, 64 wt % $Ni/SiO_2$ as a catalyst. WHSV=4.5 $h^{-1}$. Reaction temperature: 285° C. 0.4 bar $H_2$ (1 bar of total pressure). Conversion of 4-n-propylguaiacol>99%, yield to n-propylbenzene is around 7%.

Example 7. Hydrodeoxygenation

This experiment was performed according to experimental procedure III. 4-propylguaiacol was used as feedstock, 17 wt % $Ni/Al_2O_3$ as a catalyst. WHSV=2.7 $h^{-1}$. Reaction temperature: 285° C. 0.4 bar $H_2$ (1 bar of total pressure). Conversion of 4-n-propylguaiacol=86.9%, yield to n-propylbenzene<3%.

Example 8. Hydrodeoxygenation

This experiment was performed according to experimental procedure III. 4-propylguaiacol was used as feedstock, 20 wt % $Ni/TiO_2$ as a catalyst. WHSV=2.7 $h^{-1}$. Reaction temperature: 285° C. 0.4 bar $H_2$ (1 bar of total pressure). Conversion of 4-n-propylguaiacol=83.1%, yield to n-propylbenzene is around 6.5%.

Example 9. Hydrodeoxygenation

This experiment was performed according to experimental procedure III. 4-propylguaiacol was used as feedstock, 21 wt % $Ni/Al_2O_3$ as a catalyst. WHSV=4.5 $h^{-1}$. Reaction temperature: 285° C. 0.4 bar $H_2$ (1 bar of total pressure). Conversion of 4-n-propylguaiacol=64.3%, yield to n-propylbenzene<3%.

Example 10. Hydrodeoxygenation

This experiment was performed according to experimental procedure III. 4-propylguaiacol was used as feedstock, 16 wt % $Ni/SiO_2$ as a catalyst. WHSV=4.5 $h^{-1}$. Reaction temperature: 285° C. 0.4 bar $H_2$ (1 bar of total pressure). Conversion of 4-n-propylguaiacol=80.8%, yield to n-propylbenzene<3%.

Example 11. Hydrodeoxygenation

This experiment was performed according to experimental procedure III. 4-propylguaiacol was used as feedstock, 20 wt % $Ni/TiO_2$ as a catalyst. WHSV=4.5 $h^{-1}$. Reaction temperature: 285° C. 0.4 bar $H_2$ (1 bar of total pressure). Conversion of 4-n-propylguaiacol=55.7%, yield to n-propylbenzene is around 4.3%.

Example 12. Hydrodeoxygenation

This experiment was performed according to experimental procedure III. 4-propylguaiacol was used as feedstock, 50 wt % $Ni/Kieselguhr-Cr_2O_3$ as a catalyst. WHSV=9.0 $h^{-1}$. Reaction temperature: 285° C. 0.4 bar $H_2$ (1 bar of total pressure). Conversion of 4-n-propylguaiacol=67.0%, yield to n-propylbenzene<3%.

Example 13. Hydrodeoxygenation

This experiment was performed according to experimental procedure III. 4-propylguaiacol was used as feedstock, 65 wt % $Ni/SiO_2-Al_2O_3$ as a catalyst. WHSV=9.0 $h^{-1}$. Reaction temperature: 285° C. 0.4 bar $H_2$ (1 bar of total pressure). Conversion of 4-n-propylguaiacol=83.7%, yield to n-propylbenzene<3%.

Example 14. Hydrodeoxygenation

This experiment was performed according to experimental procedure III. 4-propylguaiacol was used as feedstock, 55 wt % Ni/Kieselguhr as a catalyst. WHSV=9.0 $h^{-1}$. Reaction temperature: 285° C. 0.4 bar $H_2$ (1 bar of total pressure). Conversion of 4-n-propylguaiacol=70.2%, yield to n-propylbenzene<3%.

Example 15. Hydrodeoxygenation

This experiment was performed according to experimental procedure III. 4-propylguaiacol was used as feedstock, 60 wt % $Ni/Kieselguhr-Al_2O_3$ as a catalyst. WHSV=9.0 $h^{-1}$. Reaction temperature: 285° C. 0.4 bar $H_2$ (1 bar of total pressure). Conversion of 4-n-propylguaiacol=85.0%, yield to n-propylbenzene is 3.9%.

Example 16. Hydrodeoxygenation

This experiment was performed according to experimental procedure III. 4-propylsyringol was used as feedstock, 64 wt % $Ni/SiO_2$ as a catalyst. WHSV=7.1 $h^{-1}$. Reaction temperature: 305° C. 0.4 bar $H_2$ (1 bar of total pressure). Conversion of 4-n-propylguaiacol=96.3%, yield to n-propylbenzene is around 4%.

Example 17. Hydrodeoxygenation

This experiment was performed according to experimental procedure III. 4-propylsyringol was used as feedstock, 64 wt % $Ni/SiO_2$ as a catalyst. WHSV=5.3 $h^{-1}$. Reaction temperature: 305° C. 0.4 bar $H_2$ (1 bar of total pressure). Conversion of 4-n-propylsyringol>99%, yield to n-propylbenzene is around 10%.

Example 18. Hydrodeoxygenation

This experiment was performed according to experimental procedure III. 4-propylguaiacol was used as feedstock, 64 wt % $Ni/SiO_2$ as a catalyst. WHSV=9.0 $h^{-1}$. Reaction temperature: 285° C. 0.98 bar $H_2$ (1 bar of total pressure). Conversion of 4-n-propylguaiacol=72.4%, yield to n-propylbenzene<4%.

Example 19. Hydrodeoxygenation

This experiment was performed according to experimental procedure III. 4-propylguaiacol was used as feedstock, 5 wt % $Pt/TiO_2$ as a catalyst. WHSV=4.5 $h^{-1}$. Reaction temperature: 325° C. 0.98 bar $H_2$ (1 bar of total pressure). Conversion of 4-n-propylguaiacol>99%, yield of n-propylbenzene=86.5%.

Example 20. Hydrodeoxygenation

This experiment was performed according to experimental procedure III. 4-propylguaiacol was used as feedstock, 0.5 wt % Pt/TiO$_2$ as a catalyst. WHSV=4.5 h$^{-1}$. Reaction temperature: 325° C. 0.98 bar H$_2$ (1 bar of total pressure). Conversion of 4-n-propylguaiacol=81.3%, yield of n-propylbenzene=13.7%.

Example 21. Hydrodeoxygenation

This experiment was performed according to experimental procedure III. 4-propylguaiacol was used as feedstock, 10 wt % Pt/TiO$_2$ as a catalyst. WHSV=4.5 h$^{-1}$. Reaction temperature: 325° C. 0.98 bar H$_2$ (1 bar of total pressure). Conversion of 4-n-propylguaiacol>99%, yield of n-propylbenzene=85.6%.

Example 22. Hydrodeoxygenation

This experiment was performed according to experimental procedure III. 4-propylguaiacol was used as feedstock, 5 wt % Pd/TiO$_2$ as a catalyst. WHSV=4.5 h$^{-1}$. Reaction temperature: 325° C. 0.98 bar H$_2$ (1 bar of total pressure). Conversion of 4-n-propylguaiacol>99%, yield of n-propylbenzene=73.3%.

Example 23. Hydrodeoxygenation

This experiment was performed according to experimental procedure III. 4-propylguaiacol was used as feedstock, 5 wt % Ni/TiO$_2$ as a catalyst. WHSV=3 h$^{-1}$. Reaction temperature: 325° C. 0.98 bar H$_2$ (1 bar of total pressure). Conversion of 4-n-propylguaiacol>99%, yield of n-propylbenzene=6.2%.

Example 24. Hydrodeoxygenation

This experiment was performed according to experimental procedure III. 4-propylguaiacol was used as feedstock, 5 wt % Ru/TiO$_2$ as a catalyst. WHSV=2.25h$^{-1}$. Reaction temperature: 325° C. 0.98 bar H$_2$ (1 bar of total pressure). Conversion of 4-n-propylguaiacol=97.9%, yield of n-propylbenzene<3%.

Example 25. Hydrodeoxygenation

This experiment was performed according to experimental procedure III. 4-propylguaiacol was used as feedstock, 5 wt % Pt/γ-Al$_2$O$_3$ as a catalyst. WHSV=3.0 h$^{-1}$. Reaction temperature: 325° C. 0.98 bar H$_2$ (1 bar of total pressure). Conversion of 4-n-propylguaiacol=88.4%, yield of n-propylbenzene=7.1%.

Example 26. Hydrodeoxygenation

This experiment was performed according to experimental procedure III. 4-propylguaiacol was used as feedstock, 5 wt % Pt/ZrO$_2$ as a catalyst. WHSV=2.25 h$^{-1}$. Reaction temperature: 325° C. 0.98 bar H$_2$ (1 bar of total pressure). Conversion of 4-n-propylguaiacol=70.7%, yield of n-propylbenzene=11.8%.

Example 27. Hydrodeoxygenation

This experiment was performed according to experimental procedure III. Monomers from example 2 were used as feedstock, 5 wt % Pt/TiO$_2$ as a catalyst. WHSV=3 h$^{-1}$. Reaction temperature: 325° C. 0.98 bar H$_2$ (1 bar of total pressure). Conversion of monomers>99.9%, yield of n-propylbenzene=83%.

Example 28. Hydrodeoxygenation

This experiment was performed according to experimental procedure III. 4-propylguaiacol was used as feedstock, 5 wt % Pt/TiO$_2$ as a catalyst. WHSV=6.1 h$^{-1}$. Reaction temperature: 325° C. 0.98 bar H$_2$ (1 bar of total pressure). The stability of catalyst can be found in FIG. 2.

Example 29. Hydrodeoxygenation

This experiment was performed according to experimental procedure III. 4-propylguaiacol was used as feedstock, 5 wt % Pd/TiO$_2$ as a catalyst. WHSV=9.0 h$^{-1}$. Reaction temperature: 325° C. 0.98 bar H$_2$ (1 bar of total pressure). The stability of catalyst can be found in FIG. 3.

Example 30. Hydrodeoxygenation

This experiment was performed according to experimental procedure III. 4-propylguaiacol was used as feedstock, 5 wt % Pt/γ-Al$_2$O$_3$ as a catalyst. WHSV=6.1 h$^{-1}$. Reaction temperature: 325° C. 0.98 bar H$_2$ (1 bar of total pressure). The stability of catalyst can be found in FIG. 4.

Example 31. Hydrodeoxygenation

This experiment was performed according to experimental procedure III. 4-propylsyringol was used as feedstock, 5 wt % Pt/TiO$_2$ as a catalyst. WHSV=7.1 h$^{-1}$. Reaction temperature: 325° C. 0.98 bar H$_2$ (1 bar of total pressure). Conversion of 4-propylsyringol>99%, yield of n-propylbenzene=75%.

Legend to the Figures

FIG. 1. is a graphic scheme that demonstrates the integrated biorefinery process for carbohydrate pulp, n-propylbenzene, and phenolic oligomers production from lignocellulose.

Figure 2:
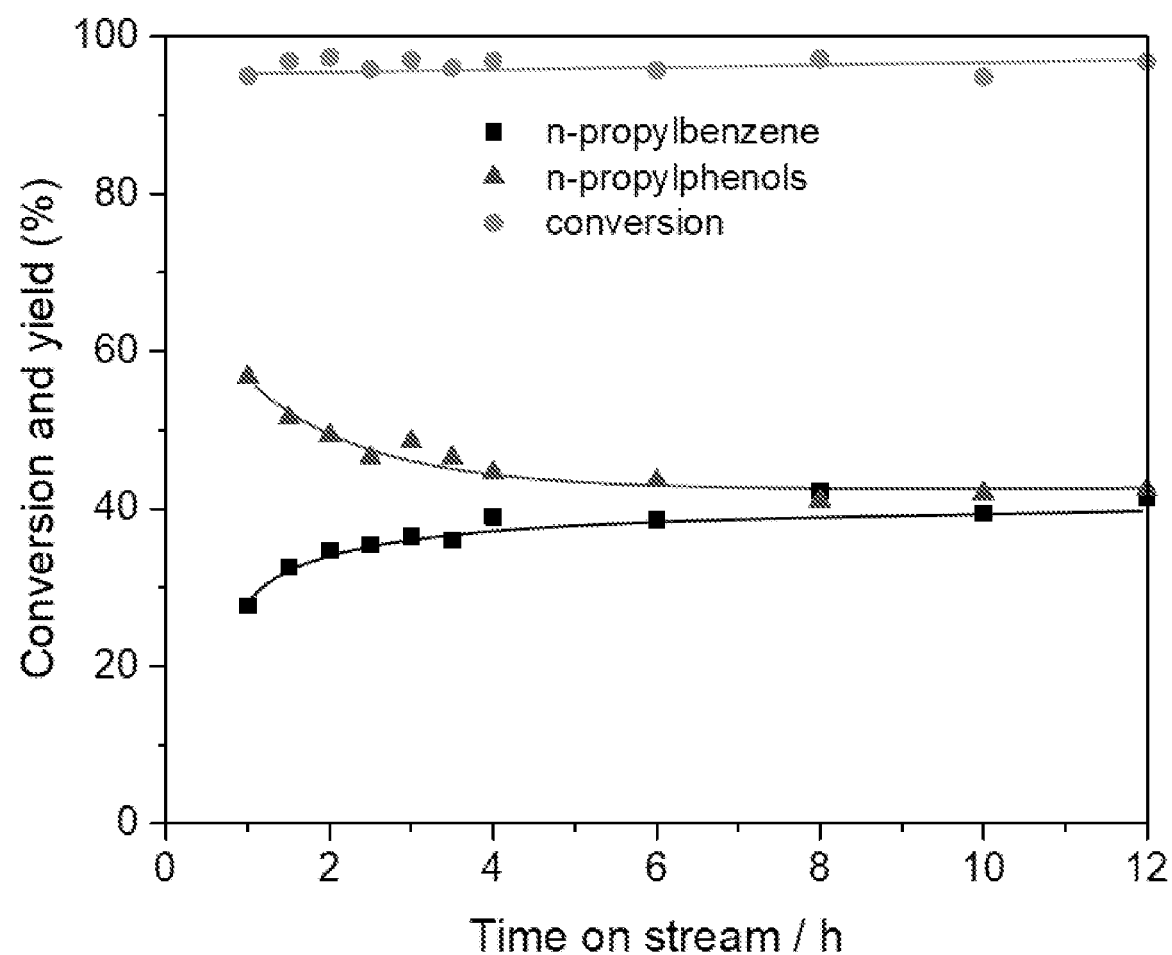
FIG. 2. The stability of $Pt/TiO_2$.

FIG. 2. is a graphic that demonstrates the stability of Pt/TiO$_2$.

Figure 3:
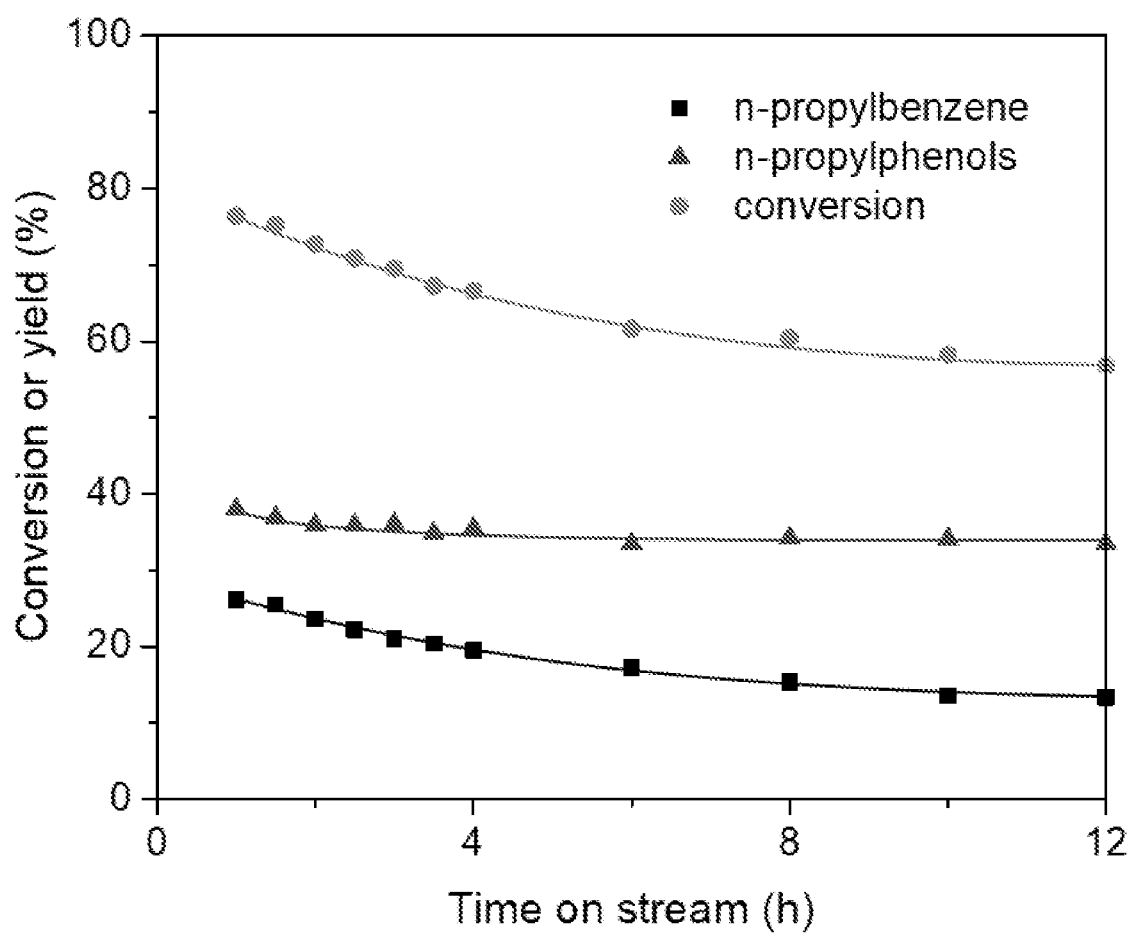
FIG. 3. The stability of $Pd/TiO_2$.

FIG. 3 is a graphic that demonstrates the stability of Pd/TiO$_2$.

Figure 4:
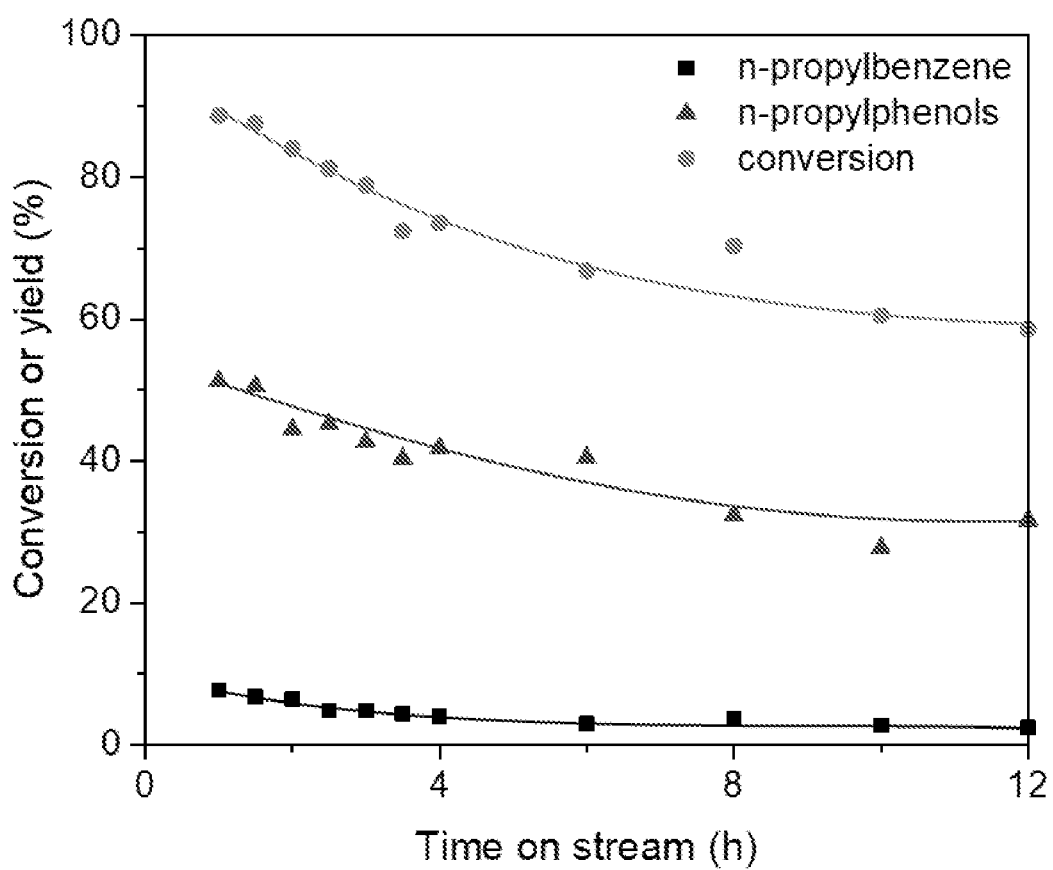
FIG. 4. The stability of $Pt/\gamma-Al_2O_3$.

FIG. 4. The stability of Pt/γ-Al$_2$O$_3$.

The invention claimed is:

1. A method comprising the steps of:
a) providing a mixture of compounds of formula (I):

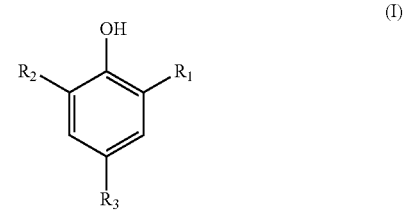

wherein:
each occurrence of R1 and R2 is independently selected to be —O—CH$_3$ or —H;
each occurrence of R3 is independently selected to be —H, or -methyl, or -ethyl, or -propyl, or -propylene, or -1-alkoxypropyl, or -3-hydroxypropyl;
b) preparing a reaction mixture by contacting said mixture of compounds of step a) in gas phase, with a reaction mixture containing a metal-based catalyst, under a hydrogen containing gas atmosphere;

wherein step b) is carried out at a temperature of at least 265° C. and a partial hydrogen pressure of at least 0.2 bar;
c) obtaining from step b) products comprising a mixture of compounds of formula (Ia), as well as methane or methanol or both;

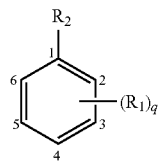

wherein:
R1 is independently selected to be —CH$_3$ or —H;
R2 is independently selected to be -propyl or -ethyl;
q represents the position on the aromatic ring, with q being any one of the numbers 2-6.

2. The method according to claim 1, comprising the steps of:
a) providing a mixture of compounds of formula (I):

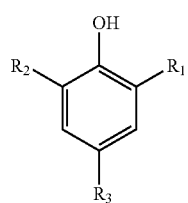

wherein:
each occurrence of R1 and R2 is independently selected to be —O—CH$_3$ or —H;
each occurrence of R3 is independently selected to be —H, or -methyl, or -ethyl, or -propyl, or -propylene, or -1-alkoxypropyl, or -3-hydroxypropyl;
b) preparing a reaction mixture by contacting said mixture of compounds of step a) in gas phase, with a reaction mixture containing a metal-based catalyst, under a hydrogen containing gas atmosphere;
wherein step b) is carried out at a temperature of at least 265° C. and a partial hydrogen pressure of at least 0.2 bar;
c) obtaining from step b) products comprising a mixture of compounds of formula (Ia), as well as methane or methanol or both;

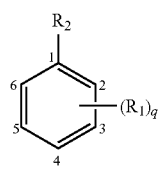

wherein:
R1 is independently selected to be —CH$_3$ or —H;
R2 is independently selected to be -propyl or -ethyl;
q represents the position on the aromatic ring, with q being any one of the numbers 2-6
wherein the transformation of (I) to (Ia) occurs via the intermediate (Ib)

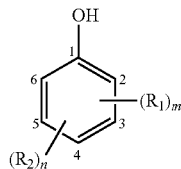

wherein:
R1 is independently selected to be —CH$_3$ or —H;
R2 is independently selected to be —H, or -methyl, or -ethyl, or -propyl;
m and n represent the position on the aromatic ring, with m being any one of the numbers 2-6 and with n being any one of the numbers 3-5, with m not being equal to n.

3. The method according to claim 1, wherein the mixture of compounds of formula (I) is subjected to hydrodeoxygenation.

4. The method according to claim 1, wherein said metal-based catalyst comprises metal attached on a support material.

5. The method according to claim 1, wherein said metal-based catalyst comprises metal attached on an oxide support material.

6. The method according to claim 1, wherein said catalyst comprises a platinum group metal (PGM) selected of platinum or palladium, and wherein this metal is on a titanium oxide support.

7. The method according to claim 1, wherein said catalyst is selected of a promoter-modified platinum catalyst or a promoter-modified palladium catalyst.

8. The method according to claim 1, wherein said catalyst achieves a constant conversion of the mixture of compounds with formula (I) for a time on stream of at least 5 hours, measured at a conversion level below full conversion.

9. The method according to claim 1, wherein in step b) a partial pressure of 0.2-10 bar H2 is used.

10. The method according to claim 1, wherein in step b) a partial pressure of 0.2-1 bar H2 is used.

11. The method according to claim 1, wherein a mixture of compounds with formula (Ia) is obtained in >60% molar yield based on a mixture of compounds with formula (I).

12. The method according to claim 1, wherein n-propylbenzene is obtained in >40% molar yield based on a mixture of compounds with formula (I).

13. The method according to claim 1, wherein said mixture of compounds of formula (I) are derived from lignocellulose.

14. The method according to claim 1, wherein said mixture of compounds of formula (I) are derived from lignocellulose feedstock and are present in the lignin monomers enrich fraction obtained via a lignocellulose biorefinery process comprising the following steps:
1) reductive catalytic fractionation (biomass fractionation with lignin depolymerisation) of lignocellulose, forming two fractions, a carbohydrate pulp and lignin oil,
2) separating the carbohydrate pulp and lignin oil fractions, 3) separating the monomer and oligomer fractions present in the lignin oil.

15. The method according to claim 1, wherein said mixture of compounds of formula (I) are derived from lignocellulose feedstock, being present in the lignin monomers fraction obtained via a lignocellulose biorefinery process comprising the following steps:
- 1.a) subjecting a lignocellulose mass in contact with a metal catalyst, $H_2$ and solvent to reductive catalytic fractionation to produce a carbohydrate pulp and a liquid,
- b) solvent evaporation from the liquid to obtain lignin oil, hereby recycling the solvent for reuse in step a, and recycling $H_2$ and formed methane for reuse in step d)
- c) contacting the lignin oil to a two-step liquid extraction with first $H_2O$ and $CH_2Cl_2$ or ethylacetate to isolate
- 1) a sugar water stream, and subsequently an extraction of the sugar-free lignin oil with an alkane solvent, such as hexane, heptane or octane, wherein are separated
- 2) lignin oligomers and
- 3) lignin monomers.

16. The method according to claim 1, wherein the lignocellulose biorefinery process comprises lignocellulose fractionation with lignin depolymerisation.

17. The method according to claim 1, wherein the lignin oil formed is rich in extractable phenolic monomers.

18. The method according to claim 1, wherein the lignocellulose mass comprises hardwood, softwood, herbaceous biomass, straw, bark, waste wood, flax shives, sugar cane bagasse, corn stover or cropresidues.

19. The method according to claim 1, wherein methyl acetate from the acetyl group of lignocellulose, separated in the solvent recovery distillation, together with excess $H_2$, $CH_4$, $CH_3OH$, and small amounts of solvent, are sent to the incineration/trigeneration to foresee heating, cooling and electricity.

20. The method according to claim 1, wherein more than 1-fold mass of n-hexane to lignin-oil extracts more than 70 wt. % of the phenolic monomers.

21. The method according to claim 1, wherein said lignin monomers fraction, together with a $H_2$-gas stream, such as the gas stream from reductive catalytic fractionation, containing amongst others methane impurities (from methane formation during RCF) are fed into the gas-phase fixed-bed setup, containing Pt or Pd catalyst to n-propylbenzene, 2) product separation is carried out in a gas-liquid separator, producing a liquor of n-propylbenzene, and a gaseous mixture of water, $CH_3OH$, $H_2$ and $CH_4$.

22. The method according to claim 1, wherein >35% of the lignin present in the lignocellulose is converted into n-propylbenzene and phenolic oligomers.

23. The method according to claim 1, wherein to obtain highly pure n-propylbenzene, impurities like n-propylcyclohexane are removed by distillation.

24. The method according to claim 1, wherein n-propylbenzene, phenolic oligomers and a carbohydrate pulp are produced from in planta lignin with an overall carbon efficiency of >60%.

* * * * *